United States Patent [19]
Bruckert et al.

[11] Patent Number: 5,390,339
[45] Date of Patent: Feb. 14, 1995

[54] METHOD AND APPARATUS FOR SELECTING A SERVING TRANSCEIVER

[75] Inventors: Eugene J. Bruckert, Arlington Heights; Stuart W. Thro, Cary, both of Ill.

[73] Assignee: Motorola Inc., Schaumburg, Ill.

[21] Appl. No.: 781,450

[22] Filed: Oct. 23, 1991

[51] Int. Cl.[6] .................. H04Q 7/02; H04B 7/26; H04B 17/00; G01S 3/02
[52] U.S. Cl. .................. 455/33.2; 455/56.1; 455/67.6; 342/457; 379/60
[58] Field of Search ................ 455/33.1, 33.2, 33.3, 455/54.1, 54.2, 56.1, 62, 63, 67.3, 67.1, 67.6, 295, 296, 297, 52.1, 226.2, 226.3, , 51.1, 51.2; 342/457, 387, 465, 378, 379, 381; 379/59, 60

[56] References Cited

U.S. PATENT DOCUMENTS

| | | | |
|---|---|---|---|
| 3,886,554 | 5/1975 | Braun et al. | 343/12 |
| 4,481,670 | 11/1984 | Freeburg | 455/33.1 |
| 4,597,105 | 6/1986 | Freeburg | 455/56.1 |
| 4,670,906 | 6/1987 | Thro | 455/56.1 |
| 4,718,081 | 1/1988 | Brenig | 455/33.1 |
| 4,728,959 | 3/1988 | Maloney et al. | 342/457 |
| 4,736,453 | 4/1988 | Schloemer | 455/33.1 |
| 4,799,062 | 1/1989 | Sanderford, Jr. et al. | 342/457 |
| 5,128,925 | 7/1992 | Dornsetter et al. | 455/56.1 |
| 5,191,342 | 3/1993 | Alsup et al. | 342/465 |

*Primary Examiner*—Edward F. Urban
*Assistant Examiner*—Mark D. Wisler
*Attorney, Agent, or Firm*—Richard A. Sonnentag; Christopher J. Reckamp

[57] ABSTRACT

A radio communication system selects a serving transceiver for a remote unit by generating and using a center of mass location estimation. The radio communication system collects uplink and downlink signal characteristics, including impaired signals caused by co-channel interference, from a set of transceivers, including those adjacent to and non-adjacent to the candidate transceiver and remote unit, to aid in the estimation of the remote unit's location within the radio communication system. Using the uplink and downlink signal characteristics, the radio communication system determines weighted coordinates related to predetermined coordinates and the signal characteristics which are used to produce a first and second center of mass coordinate estimation. The radio communication system then selects the serving transceiver to be the transceiver whose predetermined coordinates are closest to the first and second center of mass coordinate estimation.

10 Claims, 4 Drawing Sheets

METHOD AND APPARATUS FOR SELECTING A SERVING TRANSCEIVER

FIELD OF THE INVENTION

The invention relates generally to radio frequency communication systems and more particularly to cellular type radiotelephone communication systems.

BACKGROUND OF THE INVENTION

Cell selection methods in multi-cell radio communication systems to effectuate handoffs and to determine initial serving cells are known. One method selects the target serving transceiver based on the arrival time of a signal generated by a remote unit. This method chooses the transceiver that was first to receive the signal based on the presumption that the shortest radio frequency (RF) path correlates with the strongest signal. Another method relies on the absolute magnitude of received signal strength (RSS) as measured by a base site's receiver (or transceiver) resulting in a metric known as a Received Signal Strength Indication (RSSI). This method selects the serving transceiver that received the highest RSSI presuming that the "best" transceiver is that transceiver measuring the strongest signal from the remote unit. However, various signal propagation anomalies such as Rayleigh fading, shadowing (due to obstructions such as tall buildings and deep valleys), ducting, over-water paths (reflective), multipath variations, antenna gain differences (transceiver and remote antennas), signal sampling rates, and co-channel interference all tend to inject error into selection methods resulting in the selection of a serving transceiver that is very distant from the remote unit.

Temporarily selecting a distant serving site, although it received a high RSSI from the remote unit, causes excessive handoffs between cells or dropped calls as soon as the remote unit continues to move away from the serving station as may occur within a building or away from a reflective body of water. In the case of microcellular systems, (in-building systems and public communication networks) wherein a cell radius may be on the order of 10 feet instead of several thousand feet, a mobile remote unit may rapidly travel through numerous cells in short periods of time requiring many rapid handoffs.

One cell selection method as described in U.S. Pat. No. 4,481,670 issued Nov. 6, 1984, invented by Thomas A. Freeburg, and assigned to Motorola, Inc., uses RSSI measurements as measured by all base sites receiving the signal; and adjusts these RSSIs using predetermined factors specific to each cell that received the signal (such as terrain and equipment variations) and computes an adjusted RSSI. The adjusted RSSI measurement is computed for each cell (also using RSSIs as received by other cells) using a matrix of the RSSIs and the predetermined factors. The adjusted RSSIs for each cell are then combined. The cell with the largest adjusted RSSI is determined to contain the remote unit. Such a method considers all cells receiving the signals and therefore typically requires more processing time by a control station, such as a switch, to compute the location of the remote unit. In microcellular systems where numerous handoffs must take place in short periods of time, computationally intensive cell selection methods may cause dropped calls due to the delay in handoff time between cells or the selection of a distant cell that only momentarily provided an adequate communication path.

Another method of cell selection designed to reduce the time between handoffs and choose a closer cell, is described in U.S. Pat. No. 4,718,081, invented by Brenig, issued Jan. 5, 1988. This method takes a weighted average of measured field strengths of a candidate serving site and its neighboring base sites (also candidate cells and cells neighboring to the candidate serving site). The weighted average for all candidate cells are compared and the one with the highest weighted average is the selected serving cell. Although this method may afford some correction for choosing distant cells, the inaccuracy of this method is increased by the limited number of neighboring sites from which RSSI's are taken. Such a system does not adequately determine the location of the subscriber unit to reasonably assure that the selected serving cell is the closest cell to the remote unit. Other information not generally used to locate remote units, such as signals received by non-adjacent cells or impaired signals caused by co-channel interference from other remote units, can be used to more accurately locate a remote unit.

There exists a need for a cell selection method for overcoming erroneous cell selection in microcellular and other cellular systems. Such a method must also select a serving base site substantially close in proximity to the remote unit based upon a determination of a remote unit's location wherein the accuracy of selection is not limited to signal characteristics taken only by base sites neighboring to a potential candidate serving site. The signal characteristics used in the selection process should include other information normally discarded to achieve a more accurate location estimation.

SUMMARY OF THE INVENTION

A radio communication system has a plurality of transceivers having known locations and at least one remote unit communicating a signal to at least one of the plurality of transceivers. The radio communication system selects a serving transceiver for the remote unit by estimating the remote unit's location within the radio communication system in response to collected signal characteristics measured by a set of transceivers from the plurality of transceivers receiving the communicated signal. The radio communication system then selects a serving transceiver to be the transceiver whose coordinates are closest to a first and second center of mass coordinate estimation.

DETAILED DESCRIPTION OF A PREFERRED EMBODIMENT

For purposes of illustrating the various embodiments of the invention, a base site generally has one base site transceiver and is presumed to serve one geographic cell area. However, as appreciated by those skilled in the art, a cell may have multiple scan receivers and transmitters. The base sites have receivers for collecting signal characteristics from the remote units, such as downlink signal quality as measured by the remote units and transmitted back to the base sites, or uplink signal quality measurements as measured by the base site receivers. The base sites may communicate the signal either by omni-directional or directional antennas or may be satellites in the case of a satellite assisted global cellular communication system.

Figure 1A:
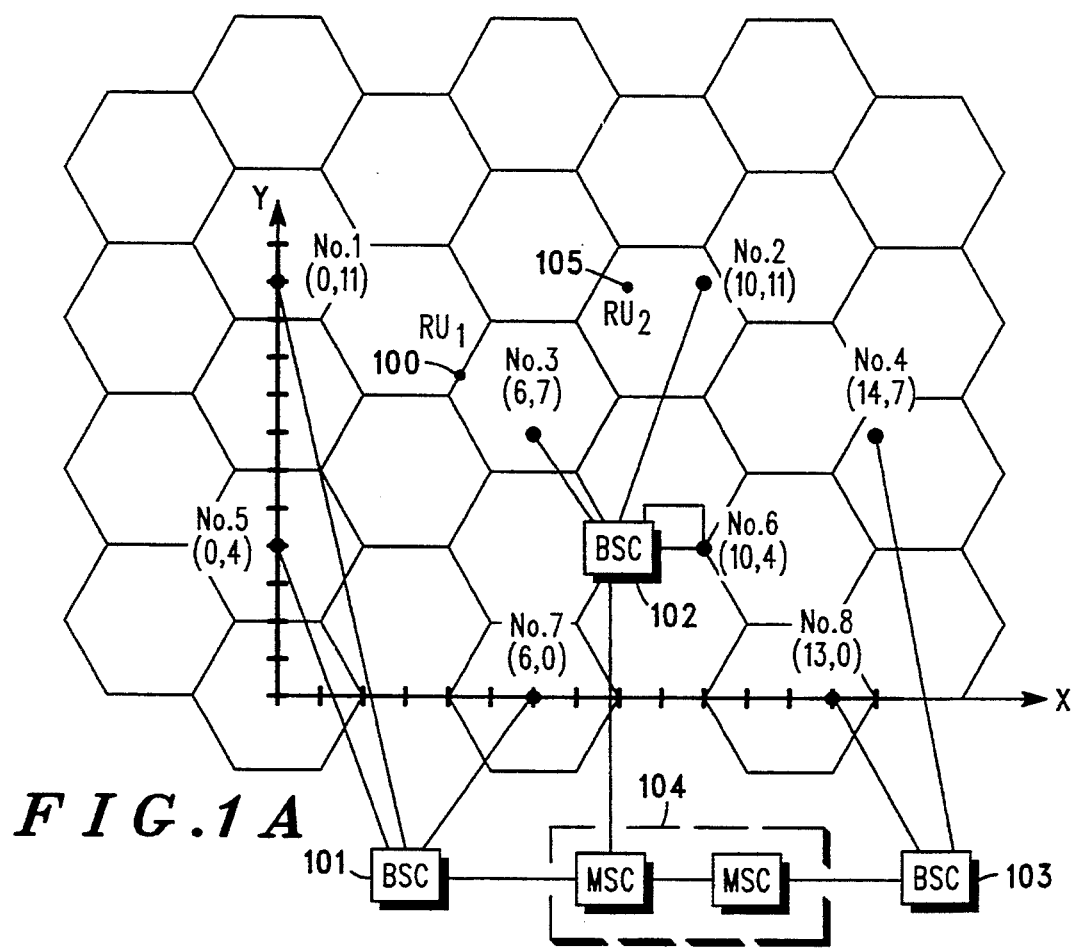
FIG. 1A is a topographical representation of transceivers having assigned location coordinates in a cellular communication system.

FIG. 1A generally depicts an assignment of Cartesian location coordinates for candidate serving base sites in a microcellular radio communication system in accordance with one embodiment of the invention. A first remote unit RU1 (100), such as a portable radiotelephone, and a second remote unit RU2 (105), such as another portable radiotelephone, are both assumed to cause co-channel interference when they communicate to their respective serving stations. RU1 (100) is served initially by base site 1 having coordinates (0,11) and RU2 (105) is initially served by base site 2 having coordinates (10,11). As shown, the set of base sites numbered 1-8 include adjacent and nonadjacent sites to the initial serving sites. Measurements from nonadjacent sites and adjacent sites are needed to generate a more accurate location estimation of the remote unit as will be shown later. In addition, not all sites receiving the remote units signals are used since the nature of the system requires rapid determination of the closest cell.

The multiple base sites may be coupled to one or several base site controllers (BSCs) (101, 102, and 103) where channel assignments and RSSI adjustments may be determined. In turn, the base site controllers are coupled to mobile switching centers (MSC) (104) where additional computing may be done or where telephone calls may be switched between the cellular network and the land-line telephone network. The MSC (104) may be an EMX series switching center available from Motorola, Inc. and having architecture as described in Motorola Instruction Manual No. 68P81054E59 published by Motorola Service Publications, Schaumburg, Ill. As is obvious to one of ordinary skill in the art, the tasks of channel assignments and RSSI adjustments may also be accomplished by the MSCs.

Figure 1B:
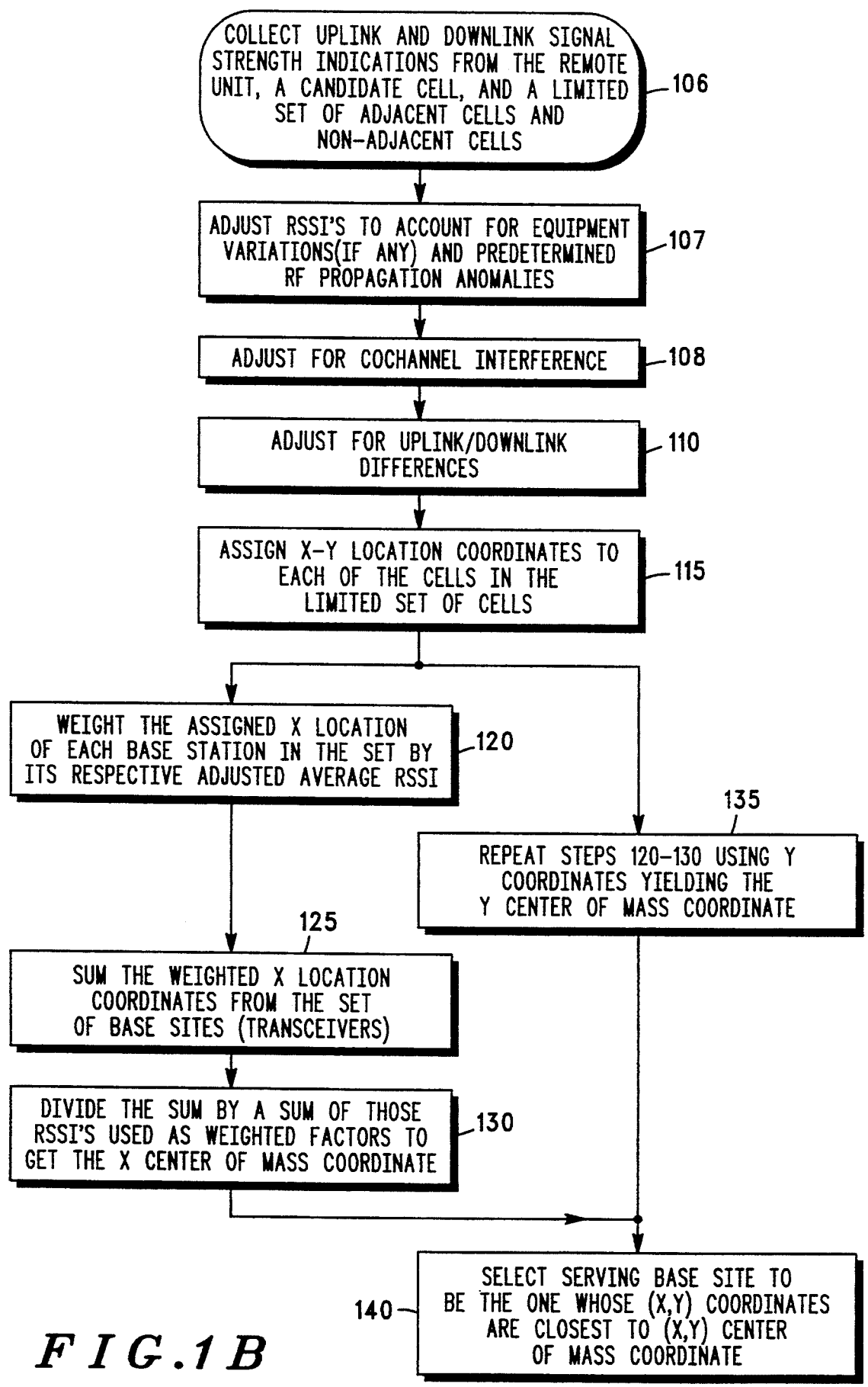
FIG. 1B is a flow diagram generally depicting one embodiment of the cell selection method in accordance with the invention.

FIG. 1B is a flow diagram generally depicting the steps for selecting a serving station based on the estimated location of the remote unit by generating a center of mass location of the remote unit in accordance with the invention. The first step (106) requires the remote units (100 and 105) and the transceivers in the set to make uplink and downlink received signal strength measurements. Such signal strength detection measurement techniques are well known in the art. Once these signal strength measurements have been made, they are collected by the base site controller and adjusted for equipment variations and predetermined radio frequency (RF) propagation characteristics (107) depending on which remote unit and base site took the measurement. These RF propagation characteristics take into account such factors as terrain, antenna height and gain, and receiver sensitivity. The adjustment techniques may be of the type described in U.S. Pat. No. 4,481,670, invented by Thomas A. Freeburg, issued Nov. 6, 1984, and U.S. Pat. No. 4,670,906 invented by Stuart W. Thro, issued Jun. 2, 1987, both assigned to Motorola, Inc. and incorporated herein by reference. In addition to these adjustments, impaired signals are also used and adjusted (108) to help determine a more accurate location estimation of the remote unit in accordance with the invention. Whereas conventional systems may discard such information, the invention as disclosed uses this information as another location estimation variable.

For example, Table 1 below lists adjusted RSSIs (in decibels) corresponding to RU1 and RU2 associated with the eight base sites in FIG. 1A.

TABLE 1

| Site # | RU1 | RU2 | (X, Y) |
|---|---|---|---|
| 1 | 5 | | (0, 11) |
| 2 | | 4(crc error) | (10, 11) |
| 3 | 22(crc error) | | (6, 7) |
| 4 | | 1 | (14, 7) |
| 5 | 3 | | (0, 4) |
| 6 | | 6(msg error) | (10, 4) |
| 7 | 1(msg error) | | (6, 0) |
| 8 | | 2 | (13, 0) |

Through timing calculations (such as is possible in time division multiplexed systems) or some other method, it is determined that RU1 and RU2 are co-channel interferers. As indicated, the co-channel interference causes some type of impairment or error in the message (msg error) in the form of a redundancy error (crc error) but the remote units are still identifiable. This may occur when the remote unit's identification bits are correctly decoded but the data or voice message is corrupted to the extent that errors are detected. In the preferred embodiment of the invention, the corrupted data is still used to improve the estimated location of the remote unit of interest. It is assumed that co-channel interference caused the corruption and a 5 unit (dB) RSSI penalty is imposed for the address that was not correctly decoded. A system operator may suitably change the penalty according to system related parameters.

Similarly, the mobile reported RSSIs must be adjusted. However, since the mobile measurement technique generally does not change from measurement to measurement (as it is the same mobile making the measurements from multiple transceivers), the adjustment factor is typically the same for all readings. The adjustment factor used also accounts for equipment related variations and estimates of measurement bias. Once the measurements have been properly adjusted, the uplink and downlink measurements are combined in a suitable manner such as through averaging or some other function such as using the maximum measurements reported by both the remote unit and the transceiver of interest (110). As appreciated by those skilled in the art, although both uplink and downlink RSSIs are used in the preferred embodiment, only the RSSIs reported by the transceivers need be used. This limitation may arise due to remote unit related cost restrictions and transceiver processing time constraints.

The center of mass location method as applied to the Cartesian coordinate system as shown in FIG. 1A and TABLE 1 includes assigning X-Y coordinates to the set of transceivers (115). The center of mass X-Y location estimation of the remote unit is generated by weighting the assigned X coordinate location of each transceiver in the set in response to its respective collected signal characteristic (120), thereby producing a weighted X location value. The weighted X location values from all transceivers in the set are summed (125) and divided by a sum of the signal characteristics used as weighting factors (130). The above steps are repeated (135) to determine a center of mass Y coordinate estimation of the remote unit. The serving base site is then chosen to be the transceiver whose coordinates are closest to the center of mass X-Y location estimation of the remote unit (140).

For RU1 (100), weighting the assigned X coordinate location of each transceiver in the set in response to its respective collected signal characteristic (120) is illustrated using TABLE 1 and FIG. 1A as follows: the X location of site 1 (coordinates 0,11) is weighted by the RSSI associated with that site which is 5 dB, the X location of site 2 (coordinates 10,11) is weighted by the RSSI associated with that site which is in effect 0 dB as a 5 dB penalty is imposed since that site received a corrupted message for RU2 indicating that RU1 caused the corruption. Since the RSSI received for RU2 (105) is 4 dB, a 5 dB penalty yields a negative RSSI, so it is given a value of zero in the calculation. Similarly, the X location of site 3 is weighted by the RSSI associated with that site which is 22 dB, however, this signal was corrupted, but it is still used in the calculation to determine the location of RU1 (100). The X location of site 6 is weighted by the RSSI associated with that site, which is effectively 1 dB. Since the RSSI of RU2 (6 dB) was corrupted (assuming by RU1), a 5 dB penalty is subtracted from the 6 dB yielding 1 dB attributed to RU1 (100). Therefore, the X location for RU1 (100) is estimated from TABLE 1 by the following equation:

$$X1 = \frac{(5)(0) + (22)(6) + (3)(0) + (1)(10) + (1)(6)}{5 + 22 + 3 + 1 + 1} =$$

$$\frac{148}{32} = 4.625.$$

The Y coordinate for RU1 may be estimated in a similar manner resulting in the equation:

$$Y1 = \frac{(5)(11) + (22)(7) + (3)(4) + (1)(4) + (1)(0)}{5 + 22 + 3 + 1 + 1} =$$

$$\frac{225}{32} = 7.03.$$

Consequently, the estimated X-Y location for the proper serving base site is given by the coordinates (4.6,7.0) which is closest to base site 3 in FIG. 1A making base site 3 the proper serving base site for RU1 given the RSSI from the set of base sites 1–8. As appreciated by those skilled in the art, in a system employing multiple reuse levels or channel reuse patterns, base site 3 may communicate to RU1 (100) on a new or different channel reuse level or pattern based upon the estimated location of the remote units.

The estimated center of mass X-Y location of RU2 (105) is determined using the same method as described above. The resulting equations are:

$$X2 = \frac{(4)(10) + (17)(6) + (1)(14) + (6)(10) + (2)(13)}{4 + 17 + 1 + 6 + 2} =$$

$$\frac{242}{30} = 8.1$$

and, $$Y2 = \frac{(4)(11) + (17)(7) + (1)(7) + (6)(4) + (2)(0)}{4 + 17 + 1 + 6 + 2} =$$

$$\frac{194}{30} = 6.5.$$

The estimated location of RU2 (105) is (8.1,6.5) which is closest to base site 3 such that base site 3 is also selected to be the serving station for RU2 (105), but on a different frequency to avoid co-channel interference with RU1 (100). The invention takes into account signal characteristics taken by base sites other than sites adjacent to a current serving base site but not necessarily all base sites receiving the signal. The location estimation also uses impaired data caused by co-channel interference to achieve a more accurate location estimate.

The control unit for implementing the method of selecting a serving transceiver for the remote unit may be located in an MSC (104) or BSC (101, 102, and 103) or may be in a combination thereof. The base site controllers (101, 102, and 103) may be of the type described in Motorola manual 68P81052 E50-A available from Motorola Parts Division, 1501 W. Shure Drive, Arlington Heights, Ill. The control unit includes computing means for estimating the remote unit's location within the radio communication system, such as a suitable microprocessor based computer, in response to collected signal characteristics measured by a set of transceivers also receiving the communicated signal. The computing means estimates the remote unit's location as described above. A means for selecting the serving transceiver is operably coupled to the computing means wherein the serving transceiver is selected to be the transceiver whose coordinates are closest to a first and second center of mass coordinate estimation.

Figure 2A:
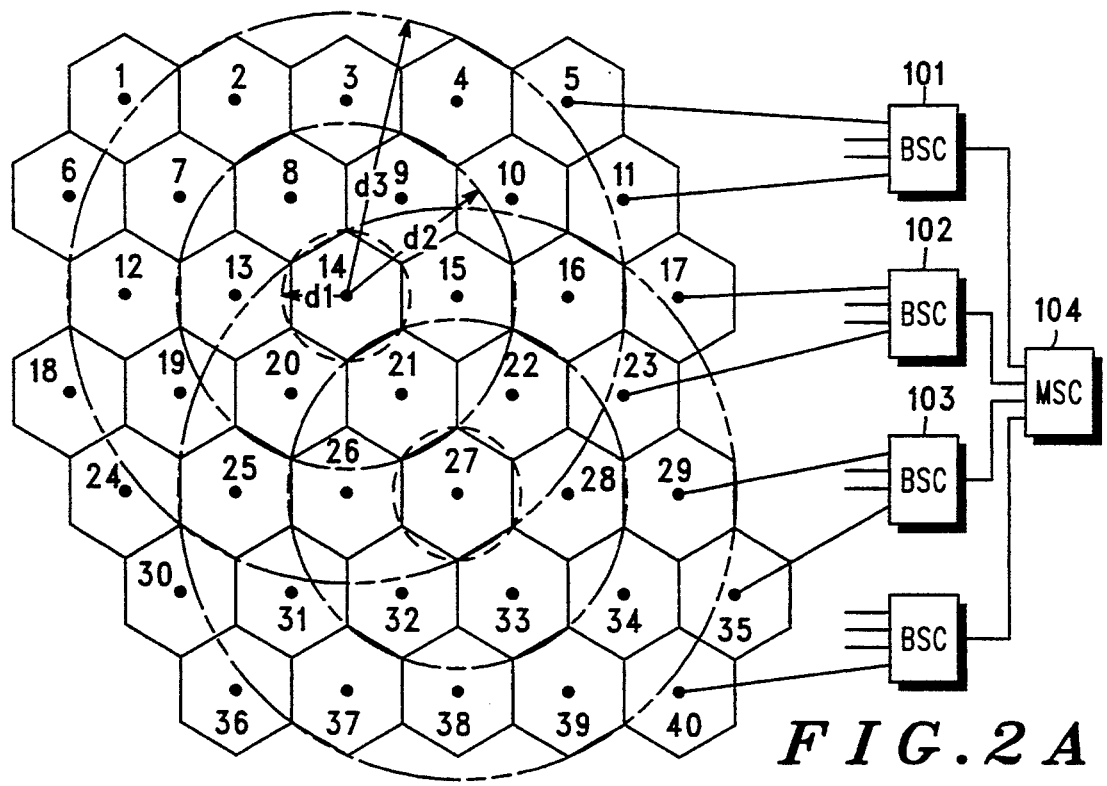
FIG. 2A is a topographical representation of a set of cells having assigned range distances.
Figure 2B:
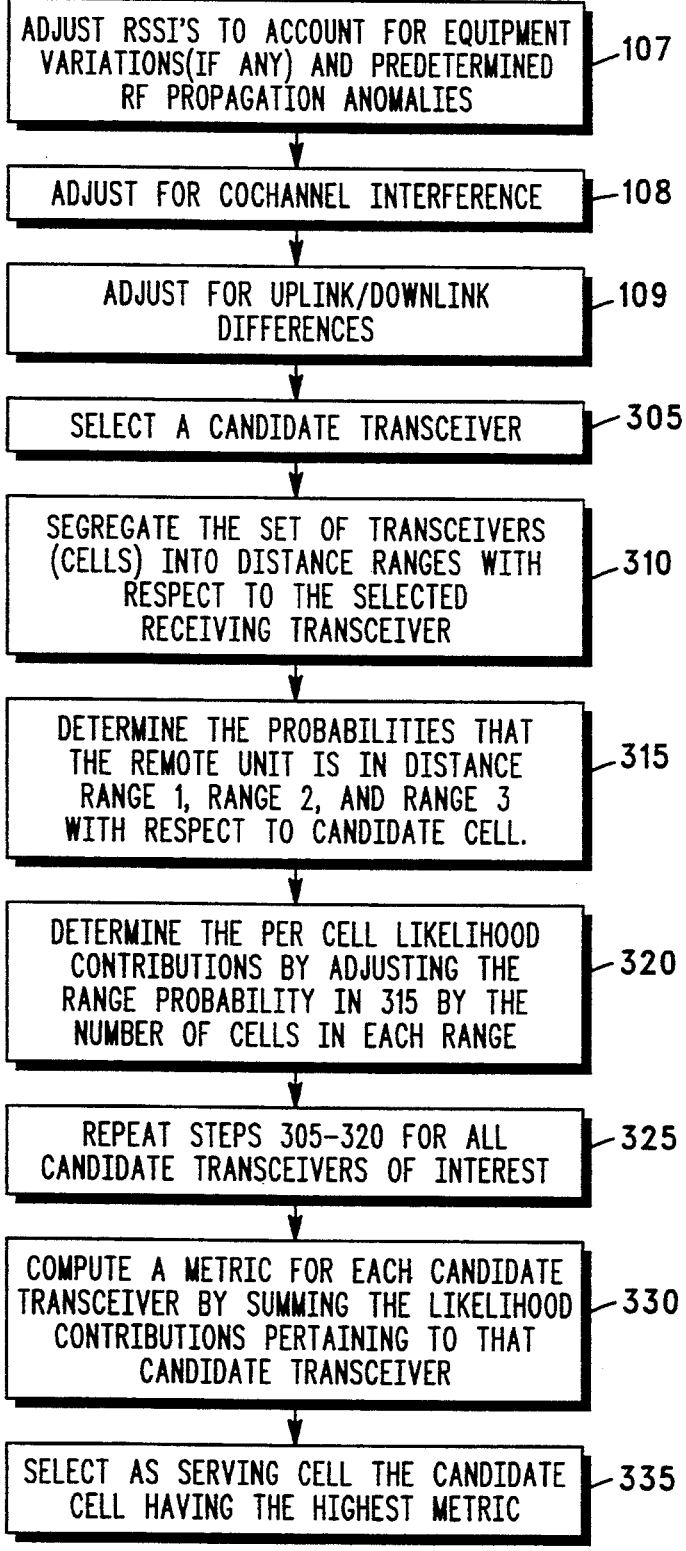
FIG. 2B is a flow diagram generally depicting a second embodiment of the cell selection method in accordance with the invention.

FIGS. 2A–2B depict another embodiment of a method for selecting a serving transceiver using assigned distance ranges from a given candidate cell of interest and posteriori probabilities determined for a given RF coverage area serviceable by a transceiver. The term transceiver is intended to include receivers or transmitters and also includes any base site RF receiver or transmitter units. In this embodiment, the location of the remote unit is determined using: the distance range to which the receiving transceiver was segregated; the number of receiving transceivers within that distance range; the adjusted RSSIs from the set of transceivers; and a predetermined RF propagation model associated with the distance ranges. For each coverage cell, a likelihood or probability that the remote unit is in that cell is estimated. That cell having the highest associated probability estimate is the optimum cell selection choice.

The RF propagation model may be determined using the following equations. The Received Signal Strength Indicator (RSSI) level reported is the difference between the signal power received at a transceiver receive site ($P_{BS\_Rx}$) in the set of candidate transceivers, and the number defined as the receive sensitivity threshold for the system ($P_{BS\_Rx\_threshold}$). This is shown in equation 1.1, where the units on all numbers are expressed as dBm. $P_{BS\_Rx\_threshold}$ is normally taken to be $-120$ dBm.

$$RSSI = P_{BS\_Rx} - P_{BS\_Rx\_threshold} \quad (1.1)$$

The signal power received at a transceiver when a remote unit transmits can be expressed as the difference between the remote unit effective radiated power (ERP) and the radio signal path loss (PL) between the remote unit and the receiving transceiver as is shown in equation 1.2.

$$P_{BS\_Rx} = ERP_{remote\_unit} - PL \qquad (1.2)$$

The path loss is modelled as shown in equation 1.3.
$$PL(dB) = 87.2 + 10\Omega \log_{10}(d) - G_{BS} + L_1(h_{BS}) + L_2(h_{remote\_unit}) + N(\mu, s) + R(t) \qquad (1.3)$$

where:
- 87.2 dB = free space path loss @900 MHz between unity gain dipole antennas separated by 1 kilometer
- $\Omega$ = propagation loss exponent; 2.0 for free space and 3.0–4.0 for normal paths.
- d = distance between remote unit and transceiver receive site expressed in km
- $G_{BS}$ = transceiver receive antenna effective gain above a unit gain dipole
- $L_1(h_{BS})$ = a loss which is a function of the transceiver antenna height
- $L_2(h_{remote\_unit})$ = a loss which is a function of the remote unit antenna height
- $N(\mu, s)$ = log normal random distribution with mean = $\mu$ and std dev = s; models effects of random attenuators on propagation
- R(t) = Rayleigh random distribution to model the effects of multipath propagation.

As each remote unit transmits, RF signal levels will be received by the set of transceivers. As reflected in equations 1.1, 1.2 and 1.3, the received signal level recovered from each site RSSI(i) can be used as an estimator (with statistical uncertainty) of the distance between the remote unit and transceiver site 'i'. The RSSI(i) data can be used to estimate the remote mobile unit's distance from each site. This, coupled with knowledge of the fixed network topography stored in the transceiver network controller data bases, can be used to estimate the remote unit's location, or less restrictively, to estimate which radio coverage cell that unit is operating in. Since each distance estimate has statistical uncertainty associated with it, the use of distance estimates derived from multiple SSI measurements helps to 'average out' or reduce the statistical uncertainty of the composite location estimate.

To estimate distances from RSSI data, several assumptions may be made. The Rayleigh multipath component R(t) is assumed to be removed, either by time averaging of the RSSI signal, through the use of space or polarization antenna diversity at the transceiver receive sites, or preferably, by a combination of the two; $L_2(h_{remote\_unit})$, the loss associated with the remote unit antenna height is assumed to impact the signal strengths received at all sites equally. If the cell selection process is predicated upon relative distances rather than absolute distances, this parameter can be ignored. Also, $L_1(h_{BS})$, the loss (or gain) associated with the transceiver antenna height, is important. One or more cells may have higher tower heights than other sites. Additionally, any site may be a mountain-top site with a high gain directional antenna. Before any distance estimates can be made, the RSSI(i) data must be equalized to a common basis. To provide antenna elevation equalization, the network controller network topography data bases include a "height above average terrain" parameter for each cell site. A loss to height relationship is also programmed into the network controller. All RSSI data received is equalized to an antenna elevation of 50 meters before distances are estimated. The value for $L_1$(50 meters) = 28.8 dB.

The $G_{BS}$ is the parameter associated with transceiver antenna gain (relative to a unity gain dipole), though it also includes the effects of transmission line losses, diversity antenna gain, multi-coupler losses, preamplifier gains and noise figures; in short, anything which impacts the effective ERP receive sensitivity of the transceiver receiver relative to that of other sites. This receiver equalization parameter is included in the network controller topographical data base for each cell site. The $\Omega$ exponent which describes the inverse relationship of path loss to distance in an average metropolitan area, is assumed to be 3.5 (other values may be more appropriate depending upon local propagation characteristics).

The lognormal distribution is $N(\mu, s)$. The value of the mean '$\mu$' is usually taken to be zero, unless the remote unit is "in-building", in which case '$\mu$' is the nominal building loss. If '$\mu$' is non-zero, this loss can be assumed to impact propagation to all sites equally. Hence if the cell selection process is predicated upon relative distances rather than absolute distances, building losses can be ignored. '$\mu$' is assumed = 0.

The standard deviation 's' typically ranges between 7.0 dB for "on-street" remote units to 13 dB for "in-building" units. Here, s is assumed = 10.0 dB, a median value. $ERP_{remote\_unit}$, the effective radiated power of the remote units, will vary depending upon the type of remote transceiver equipment used. Different values of this parameter will impact all RSSI levels equally; hence if the cell selection process is predicated upon relative distance rather than absolute distance estimates, variations in this parameter will not affect the analysis. The ERP for all units will be assumed equal to 1.0 watts or +30 dBm. The $P_{BS\_Rx\_threshold}$ is the 0 dB calibration point of the transceiver receiver SSI detectors. $P_{BS\_Rx\_threshold} = -120$ dBm would be a typical calibration level.

With the above assumptions, the RSSI to distance relationship is as shown in equations 1.4 and 1.5.
$$RSSI = ERP_{remote\_unit} - 87.2 - 10\Omega \log_{10}(d) + G_{BS} - L_1(h_{BS}) - N(m, s) - P_{BS\_Rx\_threshold} \qquad (1.4)$$

$$RSSI = 34 - 35 \log_{10}(d) + G_{BS}L_1(h_{BS}) - N(0, s) \qquad (1.5)$$

Each RSSI value received will be adjusted for the $G_{BS}$ and $L_1(h_{BS})$ parameters associated with the receiving transceiver site. The adjusted RSSI will be as shown in Equation 1.6.

$$RSSI_{adj} = RSSI - G_{BS} + L_1(h_{BS}) = 34 - 35 \log_{10}(d) - N(0, s). \qquad (1.6)$$

The methodology used for cell selection is illustrated with reference to FIGS. 2A and 2B. The uplink and downlink RSSIs from each receiving transceiver are obtained and adjusted as previously described (106). Once these signal strength measurements have been made, they are collected and adjusted for equipment variations and RF propagation characteristics (107) depending on which remote unit and transceiver site took the measurement. Any co-channel interference is accounted for in accordance with the first embodiment (108) and an average RSSI for each remote unit to receiving transceiver path is computed by averaging the uplink and downlink adjusted RSSI(i) associated with each receiving transceiver path 'i'. This process yields an adjusted received signal level $RSSI_{adj(i)}$ for each receiving transceiver 'i'. This adjusted received signal level $RSSI_{adj(i)}$ is used as an estimator (with statistical uncertainty) of the distance between the remote unit and receiving transceiver 'i', as is described below.

Using FIG. 2A for reference, assume that the MSC has received $RSSI_{(14)}$ from receiving transceiver '14'. The uplink and downlink RSSIs are obtained and adjusted as previously described (105, 108, and 110) to obtain $RSSI_{adj(14)}=15$ dB for receiving transceiver '14'. FIG. 2A illustrates how transceivers in proximity to receiving transceiver '14' have been segregated into distance ranges wherein the transceivers in any single range are a substantially similar distance from the receiving transceiver '14'. (310) Here, three ranges are shown. "Range 1", for which the radius is less than $d_1$, comprises cell 14 only. "Range 2", for which the radius is between $d_1$ and $d_2$, comprises the six adjacent cells 8, 9, 13, 15, 20, and 21. "Range 3", for which the radius is between $d_2$ and $d_3$, comprises the twelve alternate cells 2, 3, 4, 7, 10, 12, 16, 19, 22, 25, 26, and 27. (More remote ranges could be defined, though these will usually not contribute significantly to the accuracy of the cell selection methodology.)

Figure 3:
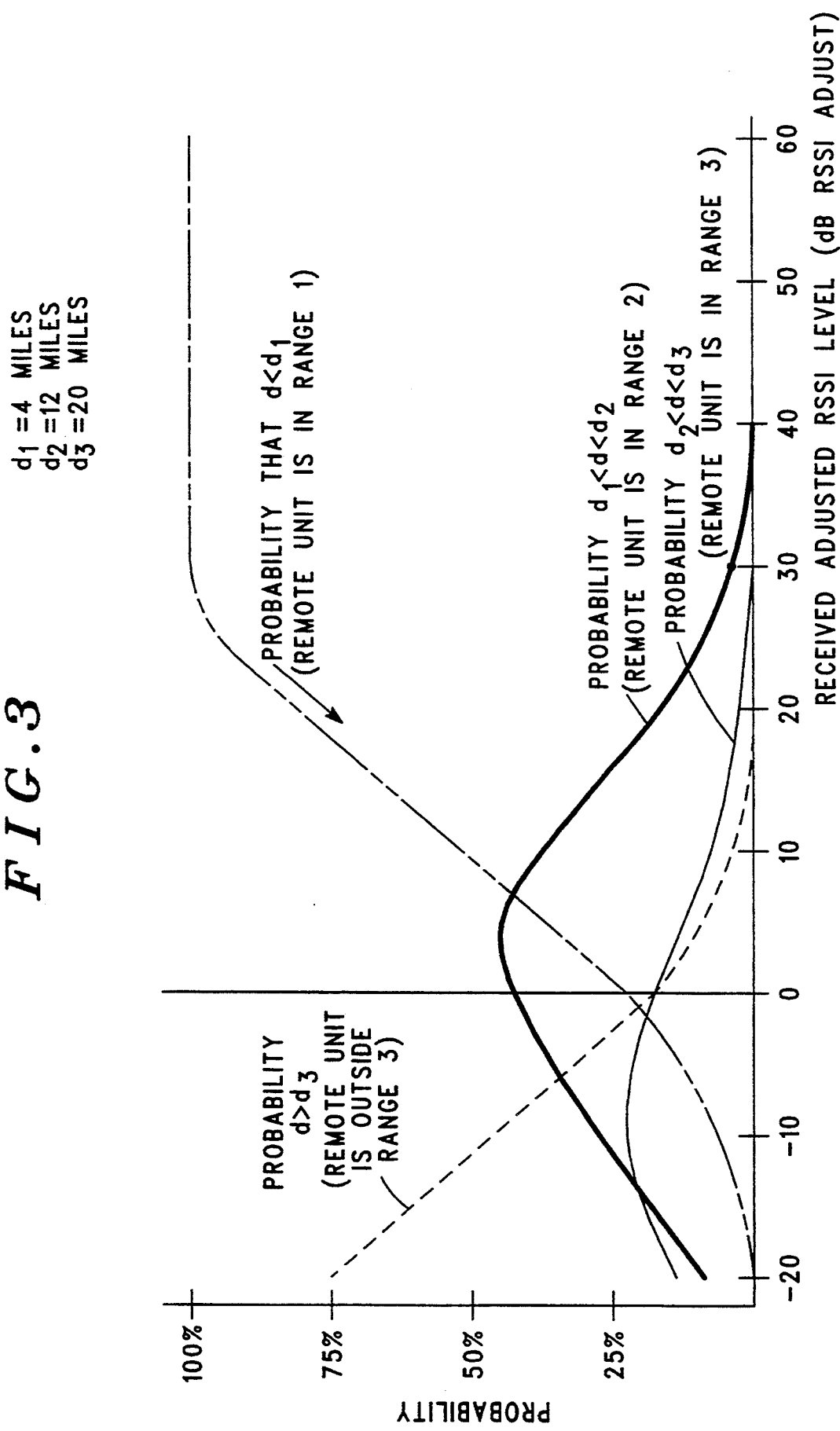
FIG. 3 is a graph based upon RF propagation models of probabilities versus signal strength measurements used in conjunction with the method of FIG. 2B.

For each receiving transceiver 'i', the associated range 1, range 2, and range 3 sites could be tabulated in a topographical data base contained within the MSC controller. For each adjusted $RSSI_{adj(i)}$, one can use equation 1.6 and readily available tables of the normal distribution to determine the probability that the associated distance between receiving site 'i' and the remote unit is within a defined range (e.g., within $d_1$, between $d_1$ and $d_2$, between $d_2$ and $d_3$, or greater than $d_3$ units away) (315). FIG. 3 shows typical probability relationships for range 1, range 2, range 3, and for ranges "outside of range 3".

Using FIG. 3 with the example $RSSI_{adj(14)}=15$ dB, the probability that the remote unit is in a given range is a follows:

| | |
|---|---|
| range 1 = | 68% |
| range 2 = | 26% |
| range 3 = | 5% |
| >range 3 = | 1% |
| sum = | 100% |

These probabilities were determined using $RSSI_{adj(14)}$ only. A different set of probabilities should be determined for each receiving transceiver 'i' using that transceiver's associated $RSSI_{adj(i)}$.

The per-cell likelihood contribution is determined by dividing the per-range probability numbers by the number of transceiver cells in that range (320). These likelihood contributions are denoted by the symbol $\partial(j,i)$, where 'j' is the number of the candidate transceiver cell and 'i' is the number of the receiving transceiver (i=14 in this example). As noted above and diagrammed in FIG. 2A, range 1 contains 1 transceiver cell, range 2 had 6 transceiver cells, and range 3 has 12 transceiver cells.

From range 1:
$\partial(14,14)=0.68$;
From range 2:
$\partial(8,14)=\partial(9,14)=\partial(13,14)=\partial(15,14)=\partial(20,14)=\partial(21,14)=0.26/6=0.0433$;
From range 3:

$\partial(2,14) = \partial(3,14) = \partial(4,14) = \partial(7,14) = \partial(10,14) = \partial(14,14) = \partial(16,14) = \partial(19,14) = \partial(22,14) = \partial(25,14) = \partial(26,14) = \partial(27,14) = 0.05/12 = 0.0042$ A corresponding set of likelihood contributions is obtained for all (or substantially all) receiving transceivers in the set (325). For each candidate cell, a metric is calculated to select the serving transceiver. This metric is calculated by summing all the likelihood contributions determined for that candidate cell (330).

$l(j)=\Sigma\partial(j,i)$ for all receiving transceivers 'i'
Hence for candidate cell 14;

$l(14)=\partial(14,1)+\partial(14,2)+\partial(14,3)+ \cdots \partial(14,14)+ \cdots$
$\partial(14,39)+\partial(14,40)$.

A serving cell 'k' is selected as the cell for which the largest metric l(k) was determined (335). This cell has the highest likelihood of containing the remote unit.

The control unit used to select the serving transceiver in the above manner includes computing means for estimating the remote unit's location within the radio communications system in response to collected signal characteristics measured by a set of transceivers also receiving the communicated signal, such as a suitable microprocessor-based system. For each transceiver receiving the remote unit's signal, the computing unit determines the associated range 1, range 2, and range 3 transceiver cells. For each receiving transceiver, the computing unit then determines a set of likelihood contributions that the remote unit is in the receiving transceiver's cell or in another cell which is in the set of ranges of interest of the receiving transceiver's cell in response to: the distance range to which the transceiver was segregated relative to the receiving cell; the number of transceivers in that distance range; the remote unit's collected signal characteristics; and a predetermined RF propagation model associated with the distance ranges. The computing unit then sums the per-transceiver likelihood contributions from substantially each receiving transceiver to compute a metric for each candidate transceiver. Once this data is compiled, the means for selecting the serving transceiver then selects that candidate transceiver having the highest transceiver metric. The means for selecting is typically the base site controller. The base site controller may be of the type described in Motorola manual 68P81052E50-1, available from Motorola Parts Division, 1501 W. Shure Drive, Arlington Heights, Ill.

A third embodiment of the present invention uses adjusted RSSIs to weight signal time delay measurements taken by the set of transceivers having known locations, to provide higher probabilities to those signals having the higher RSSIs. To take advantage of time delays to other sites the transceivers are synchronized to each other using a time-base derived from the GPS satellite system or by measuring each others signals to estimate their relative time differences. Base station selection is accomplished by estimating the remote unit's location within the radio communication system in response to collected RSSI's measured by the set of transceivers also receiving the communicated signal. Estimating the remote unit's location further comprises: determining a relative signal arrival time delay with respect to each of the transceivers receiving the signal; and weighting both the relative signal arrival time and each transceiver's known distance from at least another transceiver, in response to the collected RSSI's received by each of the transceivers. The serving station is selected in response to the weighted relative signal arrival time delay and each transceiver's known distance.

The switching center, base site controller, or other suitable control unit may be used to implement the above method where the control unit includes computing means for estimating the remote unit's location within the radio communication system, such as a microprocessor based unit. The computing means estimates the remote unit's location in response to collected signal characteristics measured by a set of transceivers also receiving the communicated signal. Estimating the remote unit's location further comprises: determining a relative signal arrival time delay with respect to each of the transceivers receiving the signal; weighting both the relative signal arrival time and each transceiver's known distance from at least another transceiver, in response to the collected RSSI's received by each of the transceivers. The computing unit is coupled to means for selecting the serving transceiver, such as a site control unit in a base site controller, in response to the weighted relative signal arrival time delay and each transceiver's known distance. The base site controller may be of the type described in Motorola manual 68P81052 E50-A available from Motorola Parts Division, 1501 W. Shure Drive, Arlington Heights, Ill.

As appreciated by those skilled in the art, numerous alternative embodiments may be devised without departing from the spirit and scope of the claimed invention. For example, any suitable location coordinate system can be used in the center of mass method in place of the Cartesian coordinate system, such as a polar coordinate system. In addition, any suitable signal characteristic may be used in combination with or in place of signal strength measurements in accordance with the aforedisclosed methods.

What we claim is:

1. In a radio communication system having a plurality of transceivers, the transceivers having known locations, and at least one remote unit communicating a signal to a candidate transceiver, a method for selecting a serving transceiver for the remote unit comprising:
    a.) estimating the at least one remote unit's location within the radio communication system in response to collected signal characteristics measured by a set of transceivers from the plurality of transceivers wherein estimating the at least one remote unit's location further comprises;
        (i) segregating those transceivers in the set of transceivers with respect to the candidate transceiver, into distance ranges, wherein transceivers segregated in any single range are a substantially similar distance from the candidate transceiver;
        (ii) determining for each transceiver a per-transceiver likelihood contribution that the at least one remote unit is in the region of the transceiver in response to at least one of: a distance range to which the transceiver was segregated, a number of transceivers within the distance range, a collected signal characteristic of the remote unit, and a predetermined RF propagation model associated with the distance ranges;
        (iii) repeating steps (i-ii) above for any transceiver in the set; and
        (iv) summing the per-transceiver likelihood contributions for each receiving transceiver to compute a metric for each transceiver;
    b.) selecting the serving transceiver as a transceiver of the set of transceivers having the highest metric.

2. The method in accordance with claim 1 wherein signal characteristics are from the group of signal quality measurements with respect to any given channel consisting of at least one of: signal strength measurements, signal time delay measurements, signal bit error rate measurements, and residual noise measurements.

3. The method of claim 1 wherein the collected signal characteristics are generated from a method comprising:
    collecting uplink signal strength measurements from an interfering co-channel signal from an identifiable second remote unit; and
    weighting the at least one remote unit's signal strength measurements, using the collected uplink signal strength from the interfering second remote unit, in response to a determination that the signal used in determining the at least one remote unit's signal strength included impaired data caused by the identifiable second remote unit.

4. In a radio communication system having a plurality of transceivers, the transceivers having known locations, and at least one remote unit communicating a signal to at least one of the plurality of transceivers, a method for selecting a serving transceiver for the remote unit comprising:
    a.) estimating the at least one remote unit's location within the radio communication system in response to collected signal strength's measured by a set of transceivers also receiving the communicated signal, wherein estimating the at least one remote unit's location further comprises;
        (i) determining a relative signal arrival time delay with respect to each of the set of transceivers receiving the signal; and
        (ii) weighting both the relative signal arrival time and each transceiver's known distance from at least another transceiver, in response to the collected signal strength's received by each of the transceivers; and
    b. selecting the serving transceiver in response to the weighted relative signal arrival time delay and each transceiver's known distance.

5. The method of claim 4 wherein the collected signal strengths are generated from a method comprising:
    collecting uplink signal strength measurements from an interfering co-channel signal from an identifiable second remote unit; and
    weighting the at least one remote unit's signal strength measurements, using the collected uplink signal strength from the interfering second remote unit, in response to a determination that the signal used in determining the at least one remote unit's signal strength included impaired data caused by the identifiable second remote unit.

6. In a radio communication system having a plurality of transceivers, the transceivers having known locations, and at least one remote unit communicating a signal to at least one of the plurality of transceivers, a control unit for selecting a serving transceiver for the remote unit comprising:

a.) computing means for estimating the at least one remote unit's location within the radio communication system in response to collected signal characteristics measured by a set of transceivers also receiving the communicated signal, wherein estimating the at least one remote unit's location further comprises;
  (i) segregating those transceivers receiving the at least one remote unit's communicated signal with respect to a candidate transceiver, into distance ranges, wherein the transceivers segregated in any single range are a substantially similar distance from the candidate transceiver;
  (ii) determining, for each transceiver receiving the remote unit's communicated signal, a likelihood contribution that the at least one remote unit is in the region of the candidate transceiver in response to at least one of: a distance range to which the receiving transceiver was segregated, a number of receiving transceivers in that distance range, the remote unit's collected signal characteristics, and a predetermined RF propagation model associated with the distance ranges;
  (iii) repeating steps (i–ii) above for any candidate transceiver; and
  (iv) summing the per-transceiver likelihood contributions from at least two receiving transceivers to compute a metric for the candidate transceiver;
b.) means, operably coupled to means for computing, for selecting the serving transceiver as the receiving transceiver having the highest metric.

7. The control unit in accordance with claim 6 wherein signal characteristics are from a group of signal quality measurements with respect to any given channel consisting of at least one of: a signal strength measurement, a signal time delay measurement, a signal bit error rate measurement, and a residual noise measurement.

8. The control unit of claim 6 wherein the collected signal characteristics are generated from a receiving unit comprising:
  means for collecting an uplink signal strength measurement from an interfering co-channel signal from an identifiable second remote unit; and
  means, operably coupled to means for collecting, for weighting the at least one remote unit's signal strength measurements, using the collected uplink signal strength from the interfering second remote unit, in response to a determination that the communicated signal used in determining the at least one remote unit's signal strength included impaired data caused by the identifiable second remote unit.

9. In a radio communication system having a plurality of transceivers, each of the plurality of transceivers having known locations, and at least one remote unit communicating a signal to at least one of the plurality of transceivers, a control unit for selecting a serving transceiver for the remote unit comprising:
  a.) computing means for estimating the at least one remote unit's location within the radio communication system in response to a collected signal strength measured by a set of transceivers also receiving the communicated signal, wherein estimating the at least one remote unit's location further comprises;
    (i) determining a relative signal arrival time delay with respect to each of the set of transceivers receiving the signal;
    (ii) weighting both the relative signal arrival time and a known distance of each transceiver from at least another transceiver, in response to the collected signal strength received by each of the transceivers; and
  b. means, operably coupled to computing means, for selecting the serving transceiver in response to the weighted relative signal arrival time delay and each transceiver's known distance.

10. The control unit of claim 9 wherein the collected signal strengths are generated from a receiving unit comprising:
  means for collecting uplink signal strength measurements from an interfering co-channel signal from an identifiable second remote unit; and
  means, operably coupled to means for collecting, for weighting the at least one remote unit's signal strength measurements, using the collected uplink signal strength from the interfering second remote unit, in response to a determination that the signal used in determining the at least one remote unit's signal strength included impaired data caused by the identifiable second remote unit.

* * * * *